United States Patent
Elkins

(10) Patent No.: US 10,119,244 B2
(45) Date of Patent: Nov. 6, 2018

(54) SYSTEM AND METHOD FOR CONTROLLING A WORK MACHINE

(71) Applicant: CNH Industrial America LLC, New Holland, PA (US)

(72) Inventor: Scott A. Elkins, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/455,790

(22) Filed: Mar. 10, 2017

(65) Prior Publication Data

US 2018/0258610 A1    Sep. 13, 2018

(51) Int. Cl.
  *G05D 1/00*    (2006.01)
  *E02F 3/84*    (2006.01)
  (Continued)

(52) U.S. Cl.
  CPC ............. *E02F 3/841* (2013.01); *B60W 10/20* (2013.01); *B60W 10/30* (2013.01); *B60W 30/10* (2013.01); *B60W 40/02* (2013.01); *E02F 3/7609* (2013.01); *E02F 9/2045* (2013.01); *G05D 1/0088* (2013.01); *G05D 1/0212* (2013.01); *G05D 1/0278* (2013.01); *B60W 2300/17* (2013.01); *B60W 2510/20* (2013.01);
  (Continued)

(58) Field of Classification Search
  USPC .......................................................... 701/25
  See application file for complete search history.

(56) References Cited

U.S. PATENT DOCUMENTS

| 5,548,516 A | 8/1996 | Gudat et al. |
| 5,612,864 A | 3/1997 | Henderson |

(Continued)

FOREIGN PATENT DOCUMENTS

| WO | 2011104703 A1 | 9/2011 |
| WO | 2012074838 A2 | 6/2012 |

OTHER PUBLICATIONS

"Global Positioning System Aided Autonomous Construction Plant Control and Guidance", G.W. Roberts et al., Automation in Construction, vol. 8, Issue 5, Jun. 1999, pp. 589-595 (3 pages).

(Continued)

*Primary Examiner* — Tyler D Paige
(74) *Attorney, Agent, or Firm* — Patrick M. Sheldrake

(57) ABSTRACT

A system for moving material at a work site includes: a work machine including a chassis, a material mover defining a material mover position, a location sensor, and a steering mechanism; and a controller system operably coupled to the material mover, the location sensor, and the steering mechanism. The controller system is configured to: store a sequence of travel paths; control the steering mechanism to follow the sequence of travel paths; determine the material mover position; determine followed travel positions of the work machine; generate an as-built map as the work machine follows the sequence of travel paths based on the material mover position and followed travel positions; compare the as-built map to a desired terrain map; generate a revised sequence of travel paths based on the comparison between the as-built map and the desired terrain map; and control the steering mechanism to follow the revised sequence of travel paths.

18 Claims, 10 Drawing Sheets

(51) Int. Cl.
*G05D 1/02* (2006.01)
*E02F 3/76* (2006.01)
*B60W 10/20* (2006.01)
*B60W 30/10* (2006.01)
*B60W 10/30* (2006.01)
*B60W 40/02* (2006.01)
*E02F 9/20* (2006.01)

(52) U.S. Cl.
CPC ..... *B60W 2520/06* (2013.01); *B60W 2710/30* (2013.01); *B60W 2720/24* (2013.01); *G05D 2201/0202* (2013.01)

(56) References Cited

U.S. PATENT DOCUMENTS

| | | |
|---|---|---|
| 5,646,844 A | 7/1997 | Gudat et al. |
| 5,862,501 A | 1/1999 | Talbot et al. |
| 6,223,110 B1 | 4/2001 | Rowe et al. |
| 6,286,607 B1 | 9/2001 | Ohtomo et al. |
| 6,434,462 B1 | 8/2002 | Bevly et al. |
| 6,845,311 B1* | 1/2005 | Stratton ................ E02F 3/847 340/870.16 |
| 7,400,956 B1 | 7/2008 | Feller et al. |
| 7,715,979 B2 | 5/2010 | Dix |
| 7,865,285 B2 | 1/2011 | Price et al. |
| 7,899,584 B2 | 3/2011 | Schricker |
| 8,078,297 B2 | 12/2011 | Lasher et al. |
| 8,144,245 B2 | 3/2012 | Vik |
| 8,306,836 B2 | 11/2012 | Nichols et al. |
| 8,326,532 B2 | 12/2012 | Kmiecik et al. |
| 2001/0023766 A1* | 9/2001 | Ohtomo ................ E02F 3/842 172/4.5 |
| 2004/0024510 A1* | 2/2004 | Finley ................ G05B 19/042 701/50 |
| 2006/0089764 A1* | 4/2006 | Filippov ................ G05D 1/027 701/23 |
| 2006/0089766 A1* | 4/2006 | Allard ................ G05D 1/0061 701/23 |
| 2012/0265371 A1 | 10/2012 | Buschmann et al. |
| 2015/0110276 A1* | 4/2015 | Gereb ................ G01H 3/125 381/56 |

OTHER PUBLICATIONS

"Steering Problems and Solutions During Construction of Roads", Heiner Kuhlmann et al., 3rd IAG/12th FIG Symposium, Baden, May 22-24, 2006 (9 pages).

"Site Design Applications for the Theater Construction Management System", E. William East, US Army Corps of Engineers, Oct. 1993 (105 pages).

"Trimble SCS900 Site Controller Software", Trimble Site Positioning Systems brochure, Marine Construction brochure, 2013 (2 pages).

European Search Report for European Application No. 18160221.0, dated Aug. 1, 2018 (6 pages).

* cited by examiner

SYSTEM AND METHOD FOR CONTROLLING A WORK MACHINE

FIELD OF THE INVENTION

The present invention relates to systems and methods for controlling work machines, and, more particularly, to systems and methods for controlling partially or fully autonomous work machines.

BACKGROUND OF THE INVENTION

Bulldozers and other material moving work machines are frequently used at work sites to move material around the work site and alter the terrain of the work site. Traditionally, bulldozers were commandeered by an operator controlling the movement, blade position, and other aspects of the bulldozer from an operator area, such as a cabin, of the bulldozer. The operator uses their knowledge of the bulldozer, current worksite terrain, and desired terrain to control the actions of the bulldozer and create the desired terrain in the work site.

As more functions and controls have been introduced to material moving work machines, it has become more difficult for operators to effectively keep track of and control all operating parameters of work machines. Further, operators may not be able to adequately control the work machine to deal with issues that develop as the work machine moves terrains, such as the work machine slipping due to unpredictable material movement as the work machine moves material. Operators also typically control the work machines based on their "feel" for the machine and its operation, which leaves room for significant inefficiencies.

To address some of the issues associated with operators manually controlling material moving work machines, autonomous work machines have been developed which provide varying degrees of autonomy to the operation of the work vehicle through a controller system. One example of such a system is described in U.S. Pat. No. 7,865,285 to Price et al., which incorporates a machine mounted stereo imaging apparatus to assist in autonomously controlling the movement of the work machine based on a desired terrain map of the work site compared to a current map of the work site which is generated from one or more images of the work site. One particular problem with the system described by Price et al. is that relying on visual images of the work site to generate the current map of the work site does not take into account how the material may shift while being moved by the work machine. If material shifts in such a way that obstructs the visualizing element(s) of the work vehicle, the current map of the work site will be inaccurate without an additional image from another vantage point, which complicates the system and increases the cost. Further, such a system cannot adequately predict and compensate for material shift that naturally occurs as the work machine moves material across the worksite.

What is needed in the art is a work machine which can address some of the previously described issues which are known in the prior art.

SUMMARY OF THE INVENTION

In accordance with an aspect of the present invention, there is provided a work machine with a controller system which is configured to control a steering mechanism of the work machine to follow a revised sequence of travel paths which are generated based on a comparison between an as-built map and a desired terrain map. The as-built map is generated based on a position of a material mover of the work machine and followed travel positions of the work machine.

In accordance with another aspect of the present invention, there is provided a system for moving material at a work site which includes: a work machine including a chassis, a material mover carried by the chassis and defining a material mover position, a location sensor carried by the chassis, and a steering mechanism configured to control a travel direction of the work machine; and a controller system operably coupled to the material mover, the location sensor, and the steering mechanism. The controller system is configured to: store a sequence of travel paths for the work machine to follow; control the steering mechanism to follow the sequence of travel paths; determine the material mover position; determine followed travel positions of the work machine based on signals from the location sensor; generate an as-built map as the work machine follows the sequence of travel paths based on the material mover position and followed travel positions; compare the as-built map to a desired terrain map; generate a revised sequence of travel paths for the work machine to follow based on the comparison between the as-built map and the desired terrain map, the revised sequence altering a material volume movement sequence of the work machine; and control the steering mechanism to follow the revised sequence of travel paths.

In accordance with yet another aspect of the present invention, there is provided a method of controlling a work machine including a chassis, a material mover carried by the chassis and defining a material mover position, a location sensor carried by the chassis, and a steering mechanism configured to control a travel direction of the work machine. The method is implemented by a controller system and includes: storing a sequence of travel paths for the work machine to follow; controlling the steering mechanism to follow the sequence of travel paths; determining the material mover position; determining followed travel positions of the work machine based on signals from the location sensor; generating an as-built map as the work machine follows the sequence of travel paths based on the material mover position and followed travel positions; comparing the as-built map to a desired terrain map; generating a revised sequence of travel paths for the work machine to follow based on the comparison between the as-built map and the desired terrain map, the revised sequence altering a material volume movement sequence of the work machine; and controlling the steering mechanism to follow the revised sequence of travel paths.

An advantage of the system described herein is that the movement of the work machine can be controlled based on how the material has been shifted about a work site compared to a desired terrain map, allowing the system to account for material shift during operation and control the work machine accordingly.

Another advantage of the system described herein is that the system can record areas where a travel anomaly has been encountered and adjust the position of the material mover based on the detected travel anomaly.

Still another advantage of the system described herein is that the operator can override the system to alter the travel path of the work machine, with the system then generating an override sequence of travel paths to account for the override.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
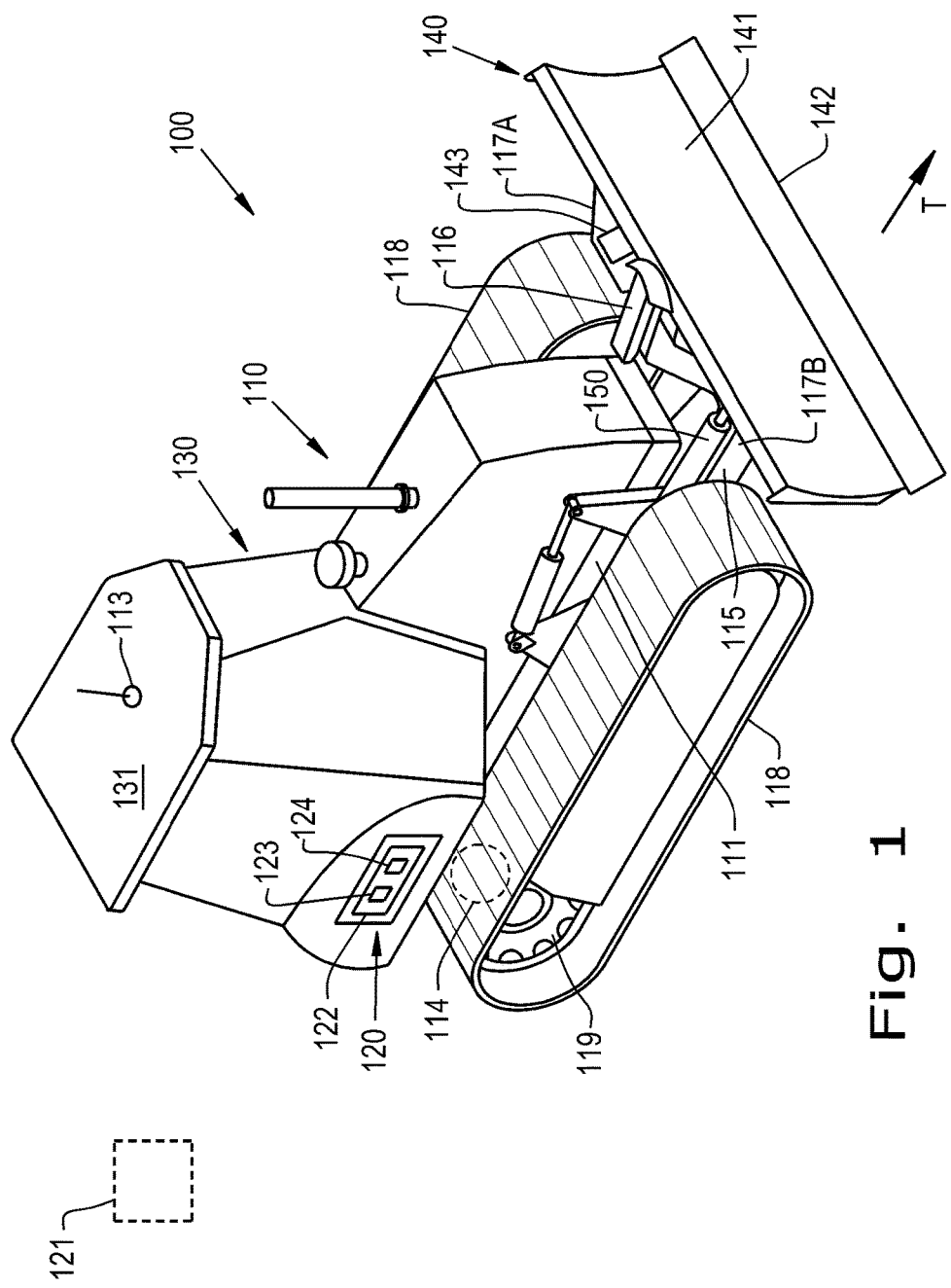
FIG. 1 is a perspective view of a work machine and controller system formed in accordance with an exemplary embodiment of the present invention.

Referring now to the drawings, and more particularly to FIG. 1, there is shown an exemplary embodiment of a system 100 for moving material at a work site which generally includes a work machine 110, shown as a bulldozer, and a controller system 120. As shown in FIG. 1, the controller system 120 is fully carried by the work machine 110, but such a configuration is optional and not necessary to implement the present invention. For example, the controller system 120 can include one or more remote controllers 121, illustrated in dashed lines, which are not carried by the work machine 110 but are operably coupled to one or more machine controllers 122, which are carried by the work machine 110 and control various functions of the work machine 110, as will be described further herein. It should thus be appreciated that various embodiments of systems formed in accordance with the present invention may include a work machine carrying an entirety of a controller system or a work machine carrying only some of the controllers of the controller system which are operably coupled to remote controllers of the controller system.

The bulldozer 110, as shown, includes a chassis 111, a material mover 140 carried by the chassis 111 and defining a material mover position, a location sensor 113 carried by the chassis 111, and a steering mechanism 114 which is configured to control a travel direction, illustrated as arrow T, of the bulldozer 110. As shown, the material mover 140 can be coupled to a c-frame 115 coupled to the chassis 111 and a mover pitch adjuster 116 which is coupled to the material mover 140 to adjust its pitch. The c-frame 115 can have a pair of forwardly extending arms 117A, 117B disposed on either side of the bulldozer 110 which couple to the material mover 140, shown as including a blade 141. The bulldozer 110 is supported on two endless tracks 118 that wrap around wheels 119 which extend laterally outward from opposite sides of the bulldozer 110. The wheels 119 can be coupled to the steering mechanism 114 to control the travel direction T of the bulldozer 110, as is known. The bulldozer 110 can also include an operator compartment 130 where an operator can access and control various systems of the bulldozer 110, such as the controller system 120, but it should be appreciated that the operator compartment 130 may be optional in configurations where the bulldozer 110 is fully autonomous and there is no need for an operator to ride with the bulldozer 110 during operation. It should be appreciated that the bulldozer 110 shown in FIG. 1 is merely one exemplary embodiment of a work vehicle which can be incorporated in the system 100 formed in accordance with the present invention, and can be replaced by other types of work vehicles such as a tractor-loader-backhoe (TLB), if desired.

The material mover 140, which can include a blade 141, allows the bulldozer 110 to move a volume of material as the bulldozer 110 travels in the travel direction T. As shown, the blade 141 can have a curvature that allows the blade 141 to scoop up and push material forward as the bulldozer 110 travels in direction T. The blade 141 defines a bottom edge 142 which can define the material mover position, as the relative distance between the bottom edge 142 of the blade 141 and the ground on which the bulldozer 110 is moving defines the ability of the blade 141 to move material during travel. If the bottom edge 142 is raised above a ground plane, for example, the blade 141 may not be able to access and push as much material compared to when the bottom edge 142 is level or below the ground plane. In this sense, the material mover position can approximately estimate a material volume movement capacity of the material mover 140, which is described further herein. In order to monitor the material mover position, the material mover 140 can include a material mover position sensor 143 which is coupled to the blade 141 and outputs signals indicative of the material mover position to the controller system 120, which is described further herein. While the material mover 140 is shown and described as being adjustable to change the material mover position, as is known, the material mover 140 can also be configured to fixedly couple to the chassis 111 and allow minimal, if any, position adjustment. Further, it should be appreciated that while the material mover 140 is shown as a curved blade 141, the material mover 140 can have any type of configuration suitable for capturing and moving material in the travel direction T of the bulldozer 110.

The location sensor 113, which is shown as a global positioning satellite (GPS) antenna, can be placed on a top surface 131 of the operator compartment 130 and couple to the controller system 120 to determine a current position of the bulldozer 110 using any suitable configuration and method. While the location sensor 113 is shown as being placed on the top surface 131 of the operator compartment 130, the location sensor 113 can be placed anywhere on the bulldozer 110 which allows the location sensor 113 to sense the location of the bulldozer 110. In some instances, the location sensor 113 may incorporate multiple antennas to more precisely determine the position of the bulldozer 110, as is known. Further, while the location sensor 113 is shown as being hard-wired to the controller system 120, the location sensor 113 can be configured to wirelessly communicate with the controller system 120 to feed position signals of the bulldozer 110 to the controller system 120 from any location on the bulldozer 110 without the need for wires connecting the location sensor 113 to the controller system 120. It should thus be appreciated that the location sensor 113 can be placed on various locations of the bulldozer 110 and operatively coupled to the controller system 120 in a variety of ways.

The controller system 120, as described previously, can include one or more machine controllers 122 carried by the bulldozer 110 and, if desired, one or more remote controllers 121. The controller system 120 is operatively coupled to the material mover 140, the location sensor 113, and the steering mechanism 114 to control various functionalities of these elements. As used herein, "operatively coupled" should be understood to mean there is a data connection between the controller system 120 and the material mover 140, the location sensor 113, and the steering mechanism 114, which can be hardwired and/or wireless, that allows data signal communication between the controller system 120 and the material mover 140, location sensor 113, and steering mechanism 114. Such operative coupling allows the controller system 120 to analyze signals from the coupled elements and adjust the operation of the coupled elements, as will be described further herein. The controller system 120 can include one or more memory modules 123 for storing controller instructions and one or more electronic processing circuits (EPC) 124 for executing the stored instructions, which is well-known and thus requires no further explanation.

Figure 2:
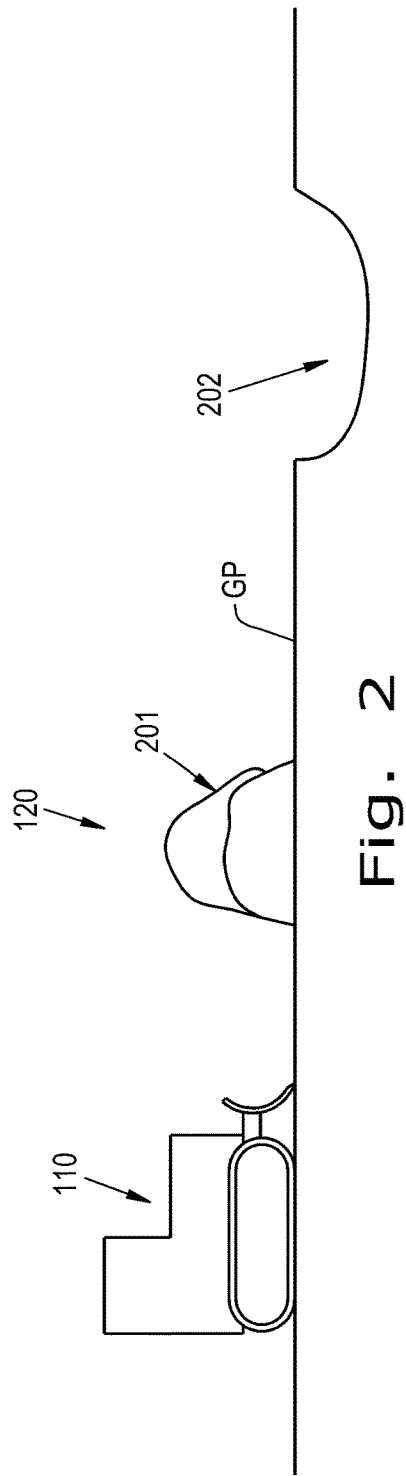
FIG. 2 is a side view of the work machine shown in FIG. 1 at a work site.

Referring now to FIG. 2, a side view of a work site map 200 is shown with the bulldozer 110 on a ground plane GP. As can be seen, the work site map 200 has a material mound 201 rising above the ground plane GP and a ditch 202 in the ground plane GP. In accordance with known techniques, the work site map 200 can be translated into a 3-dimensional point cloud representation to allow analysis and manipulation of the work site map 200 by an EPC, such as one or more EPCs 124 of the controller system 120. When translated, the ground plane GP of the work site map 200 can define an X-Y Cartesian plane as utilized by known GPS systems with landmarks, such as the mound 201 and ditch 202, placed on the Cartesian plane and assigned positive or negative Z-axis values to correlate with the height (or depth) of the landmark. Such techniques for converting work site map surveys into translated work site maps are known in the art and are not further described herein for the sake of brevity.

Figure 3:
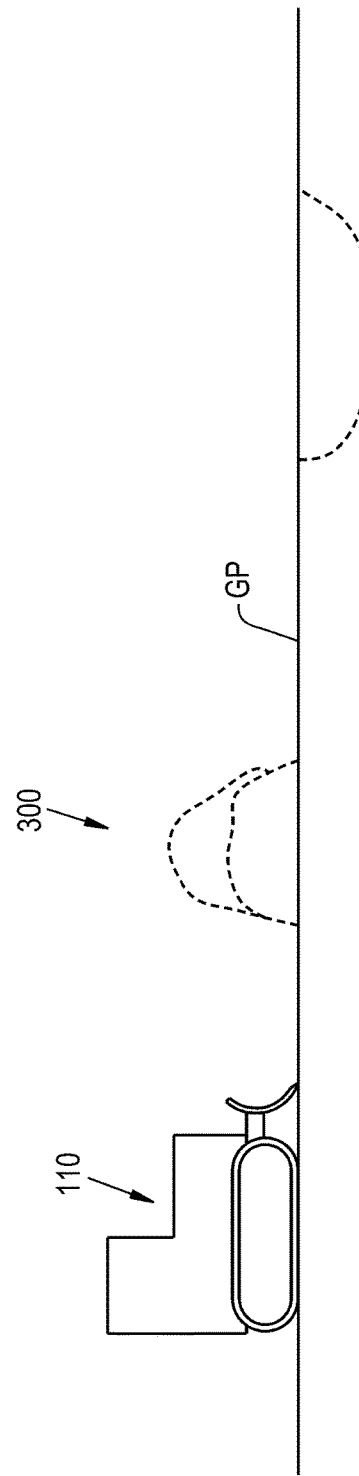
FIG. 3 is a generated side view of the work machine shown in FIG. 1 on a desired terrain map which is generated to control the work machine.

Referring now to FIG. 3, a desired terrain map 300 formed in accordance with an exemplary embodiment of the present invention is shown with the bulldozer 110 traveling on the ground plane GP. As can be seen, the desired terrain map 300 has the material mound 201, which is shown in dashed lines for illustrative purposes, removed and the ditch 202, which is also shown in dashed lines for illustrative purposes, filled. The resulting terrain of the desired terrain map 300, therefore, is a relatively flat ground plane GP with no terrain features extending either above or below the X-Y Cartesian plane defined by the ground plane GP. The desired terrain map 300 can be built from the work site map 200 by a site engineer or other professional using any type of manipulation techniques, with many such techniques being known. It should be appreciated that the shown desired terrain map 300 is for illustrative purposes only, and other desired terrain maps can be generated in accordance with various embodiments of the present invention.

Figure 4:
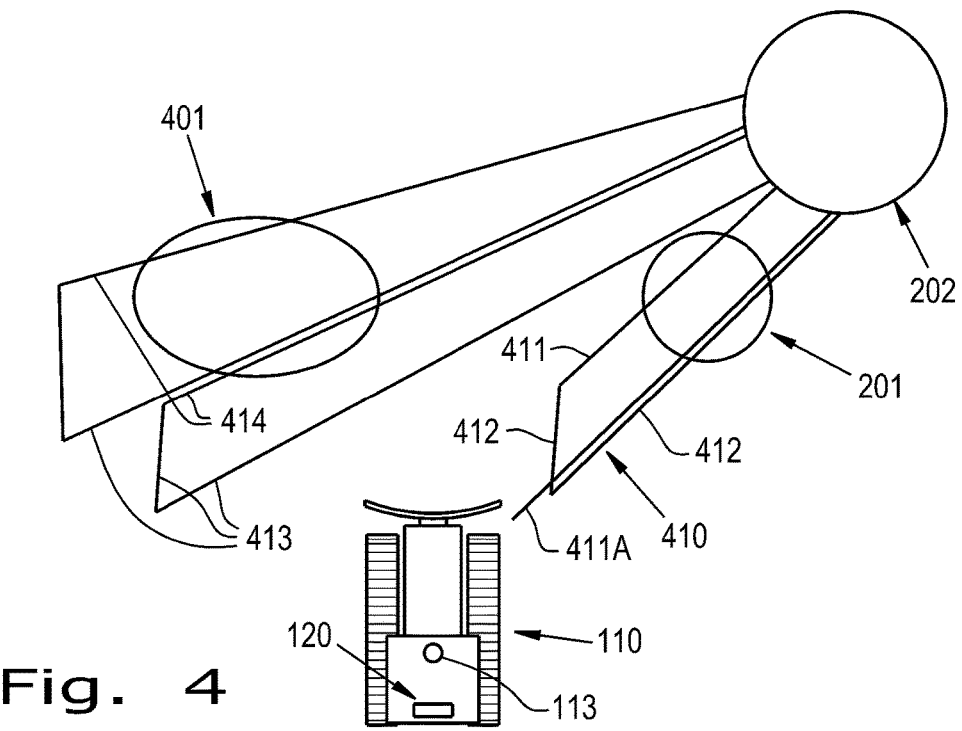
FIG. 4 is a top view of a map illustrating operation of the controller system in accordance with an exemplary embodiment of the present invention to control the work machine shown in FIG. 1 and create the desired terrain map shown in FIG. 3.

Once the desired terrain map 300 is generated, the work site map 200 can be compared to the desired terrain map 300, by the controller system 120 or other element, to determine a sequence of travel paths for the bulldozer 110 to follow, with such a sequence 410 being shown in FIG. 4. As can be seen, the sequence 410 includes a plurality of both forward travel paths 411 and reverse travel paths 412 which are computed so that the bulldozer 110 pushes material from the mound 201 into the ditch 202 in order to reduce the height of the mound 201 and fill the ditch 202 to produce the relatively flat ground plane GP. As can be seen, a first travel path 411A is generated near a side of the mound 201 which allows the bulldozer 110 to push a volume of material from the mound 201 into the ditch 202 as the bulldozer 110 follows a straight line of the travel path 411A. The generated first travel path 411A can be generated so the bulldozer 110 pushes the maximum volume of material allowed while also safely operating the bulldozer 110. The generation of the travel paths 411, 412 can take into account parameters that define the safe and efficient operation of the bulldozer 110 including but not limited to the volume capacity of the material mover 140, the weight of the bulldozer 110, the grade of the mound 201, the turning radius of the bulldozer 110, the material compaction of the mound 201, obstacles on the work site, etc. If it is determined during travel path generation that there is not enough material in the mound 201 to fill the ditch 202, a material source 401, such as material from a dump truck, can be placed on the work site and additional travel paths 413, 414 can be generated so the bulldozer 110 can move material from the material source 401 into the ditch 202 and fully fill the ditch 202. These additional travel paths 413, 414 can be generated with the same or different operating parameters to ensure the bulldozer 110 efficiently and safely moves material from the material source 401 into the ditch 202. Once the travel paths 411, 412, 413, 414 are generated, the travel paths 411, 412, 413, 414 can be stored in the controller system 120 and the controller system 120 can control the steering mechanism 120 to guide the bulldozer 110 along the travel paths 411, 412, 413, 414 during forward travel of the bulldozer 110.

Figure 5:
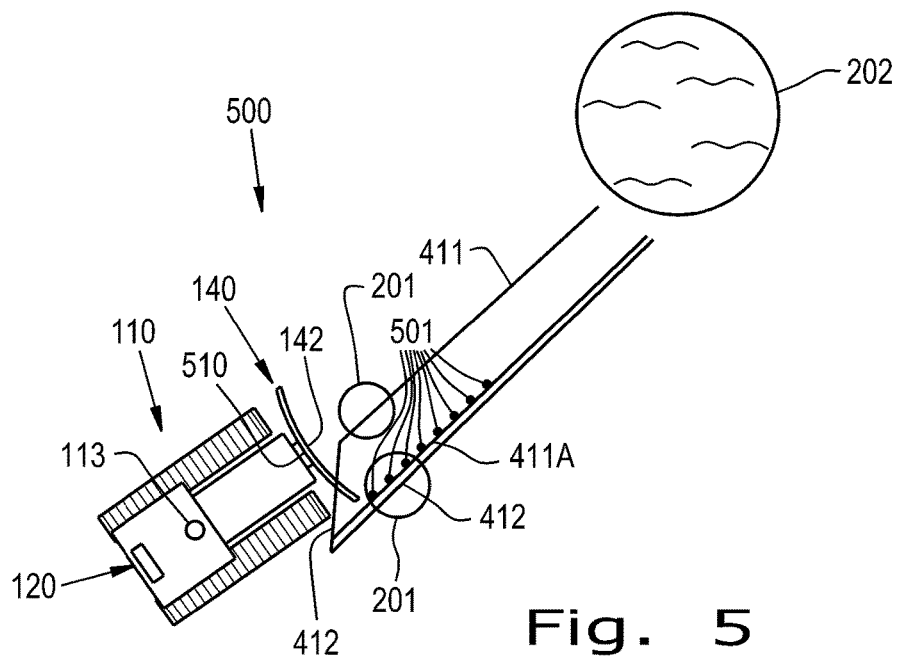
FIG. 5 is a generated as-built map formed in accordance with an exemplary embodiment of the present invention.

Prior to or during the bulldozer 110 following the travel paths 411, 412, 413, 414, changes in the work site conditions or unexpected conditions of the work site may cause following the initially generated sequence of travel paths 411, 412, 413, 414 to not direct the bulldozer 110 in a safe and/or efficient manner. For example, there may be an unexpected compaction of material in the mound 201 that is not accounted for during generation of the travel paths 411, 412, 413, 414 which detrimentally affects the volume of material moved by the material mover 140 as the bulldozer 110 travels through the mound 201. To account for such unexpected conditions, and referring now to FIG. 5, an exemplary embodiment of the controller system 120 formed in accordance with the present invention is configured to generate an as-built map 500 based on followed travel positions 501 of the bulldozer 110 as well as the material mover position 142. To generate the as-built map 500, the controller system 120 can determine the material mover position 142 by receiving signals from the material mover position sensor 142 of the material mover 140 corresponding to the position of the bottom edge 142 of the blade 141 and determine followed travel positions 501 of the bulldozer 110 by receiving signals from the location sensor 113. Based on these signals, the controller system 120 can generate the as-built map 500 as an approximation of material volume that has been moved by the bulldozer 110 on the assumption that the material mover position 142 controls the volume of material the material mover 140 can push as the bulldozer 110 travels forward and the followed travel positions 501 control where the bulldozer 110 has pushed the material moved by the material mover 140. The controller system 120 can also be configured so the as-built map 500 incorporates the mound 201 and ditch 202 of the work site map 200 to determine where the material mover 140 moves material from and where the material mover 140 moves the material to during travel. For example, the controller system 120 can be configured to subtract the volume of material moved by the material mover 140 from the mound 201 from the as-built map 500 when the bulldozer 110 travels over the mound 201 and add the volume of material moved by the material mover 140 into the ditch 202 to the as-built map 500 when the bulldozer 110 travels over the mound 201 and adjacent to the ditch 202, implying that the material mover 140 has dumped the carried volume of material into the ditch 202.

In certain material mover positions, the material mover 140 may not be moving material as the bulldozer 110 travels, such as a material mover position where the bottom edge 142 of the blade 141 is raised above the ground and is not contacting material. To more accurately generate the as-built map 500, the controller system 120 can be configured to only factor in followed travel positions 501 in which the material mover position 142 is below a certain threshold level, indicating that the material mover 140 is actually contacting material as the bulldozer 110 travels, when generating the as-built map 500 based on the material mover position 142 and followed travel positions 501. Alternatively, or in addition, the bulldozer 110 can include a resistive load sensor 510 coupled to the material mover 140 and the controller system 120 which outputs signals indicating a resistive load experienced by the material mover 140 during travel of the bulldozer 110. In such an embodiment, the controller system 120 can be configured to only factor in followed travel positions 501 in which the resistive load sensor 510 outputs signals above a threshold level, indicating that the material mover 140 is moving a significant volume of material, when generating the as-built map 500 based on the material mover position 142 and followed travel positions 501. It should be appreciated that the foregoing embodiments of the controller system 120 are exemplary only, and other ways of contributing to the accuracy of the as-built map 500 generation can be utilized in accordance with the present invention.

Figure 6:
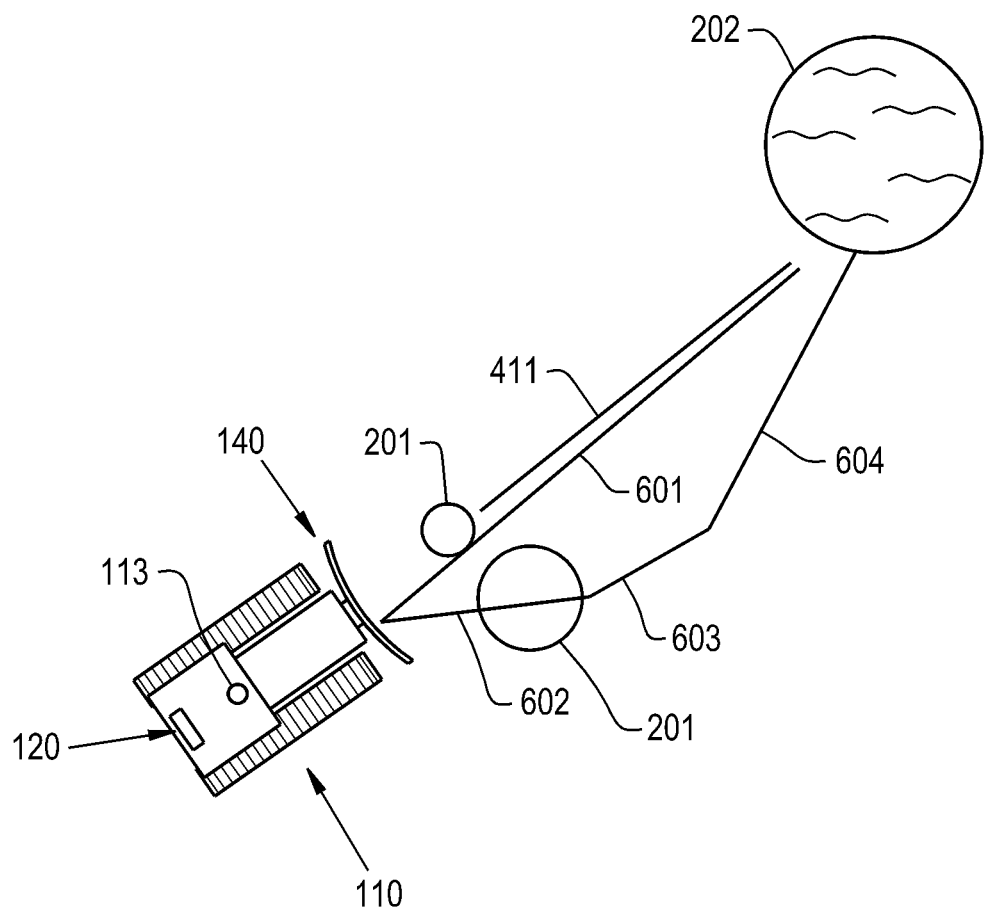
FIG. 6 is a top view of a map illustrating a revised sequence of travel paths generated by the controller system in accordance with an exemplary embodiment of the present invention.

While the bulldozer 110 travels across a work site, the controller system 120 can generate the as-built map 500 to approximate the volume of material that has been moved by the material mover 140 during travel of the bulldozer 110 and where the material mover 140 has placed the volume of material. The controller system 120 can then compare the as-built map 500 to the desired terrain map 300 to determine whether the sequence of travel paths 411, 412, 413, 414 is safely and efficiently moving material from the mound 201 into the ditch 202. If, for example, the comparison between the as-built map 500 and the desired terrain map 300 indicates that the bulldozer 110 has not moved the entire volume of the material from the mound 201 into the ditch 202, the controller system 120 can then generate a revised sequence of travel paths 601, 602, 603, 604, illustrated in FIG. 6, to alter a material volume movement sequence of the bulldozer 110 and control the steering mechanism 114 to follow the revised sequence of travel paths 601, 602, 603, 604 so the material mover 140 dumps the entire volume of material from the mound 201 into the ditch 202. The controller system 120 can determine that a revised sequence of travel paths 601, 602, 603, 604 should be generated if, for example, the as-built map 500 indicates that the volume of material moved by the bulldozer 110 is not equal to the volume of the mound 201. In this sense, the comparison between the as-built map 500 and the desired terrain map 300 allows the controller system 120 to account for unexpected work site conditions which may alter the material volume movement sequence of the bulldozer 110 and appropriately control the steering mechanism 114 so the work site can be altered into the desired terrain map 300. The as-built map 500 also allows the controller system 120 to approximate the effect of each travel path 411, 412, 413, 414, 601, 602, 603, 604 on material volumes at the work site and determine how to efficiently and safely control the steering mechanism 114 to shape the work site into the desired terrain map 300.

Figure 7:
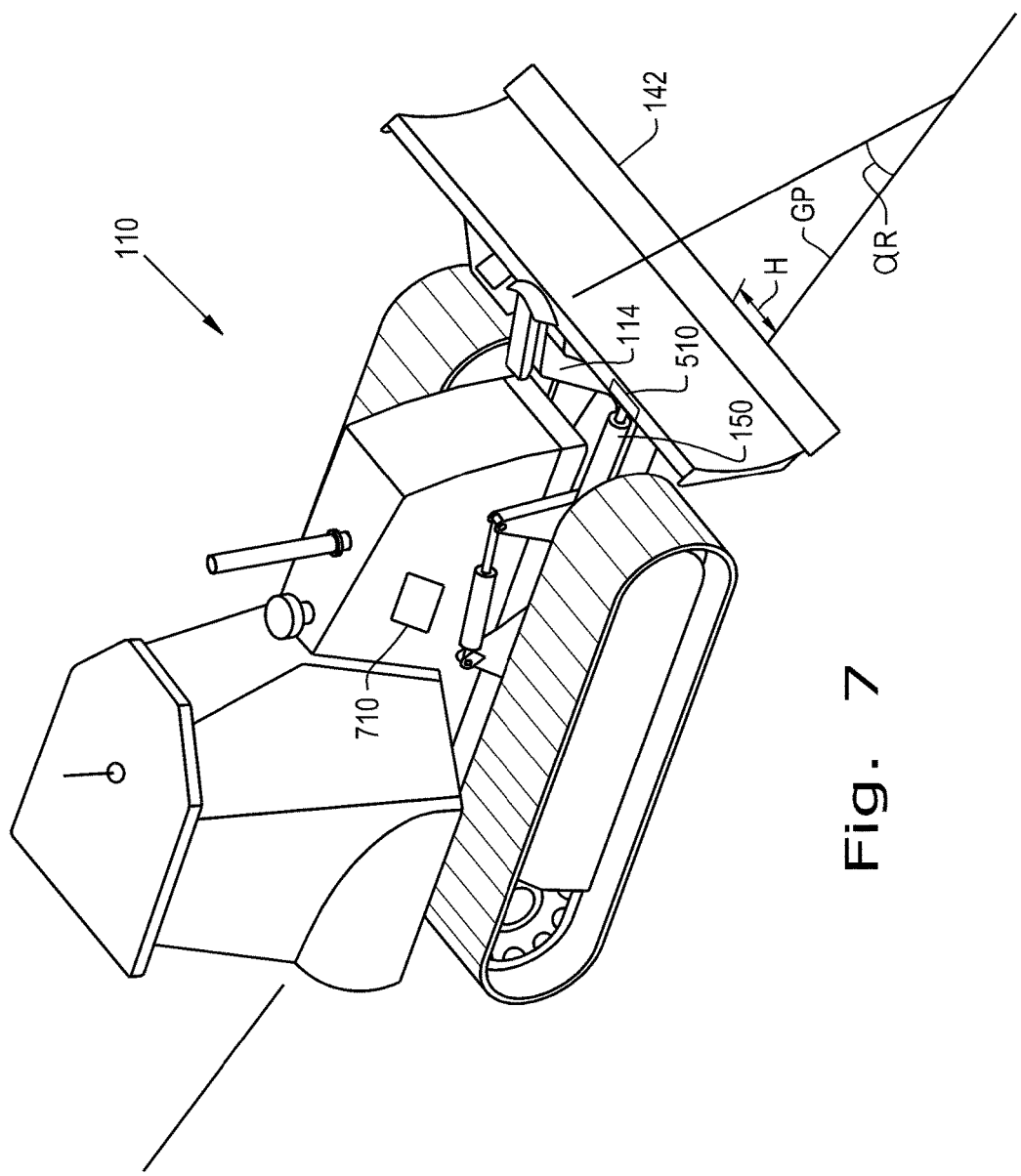
FIG. 7 is a side view of the work machine shown in FIG. 1 with the controller system adjusting a material mover position in accordance with an exemplary embodiment of the present invention.

As the bulldozer 110 travels and moves material, the bulldozer 110 may experience travel anomalies that make travel or operation of the bulldozer 110 unsafe. Such travel anomalies may include, but are not limited to, a bulldozer slip, an undesired fill of the material 140, and/or an undesired tilt of the bulldozer 110. To safely and efficiently operate the bulldozer 110, and referring now to FIG. 7, the bulldozer 110 can include one or more operating parameter sensors, such as the previously mentioned resistive load sensor 510 and/or a tilt sensor 710, which outputs signals as the bulldozer 110 travels indicating one or more respective operating parameters of the bulldozer 110, such as the volume fill of the material mover 140 and/or a tilt of the bulldozer 110. When the output signal(s) from the operating parameter sensor(s) 510, 710 are outside of an acceptable operating range as the bulldozer 110 follows the revised sequence of travel paths 601, 602, 603, 604, the controller system 120 can be configured to detect this as a travel anomaly and control an actuator 150 linked to the material mover 140 to adjust the material mover position 142. By adjusting the material mover position 140 as the bulldozer 110 is already following the revised sequence of travel paths 601, 602, 603, 604, which alters the material volume movement sequence of the bulldozer 110, the controller system 120 can attempt to correct inefficient and/or unsafe volume movement by the bulldozer 110 which is not corrected by following the revised sequence of travel paths 601, 602, 603, 604. The controller system 120 can be operatively coupled to the actuator 150 to adjust a height H of the material mover position 142, a rake angle αR of the material mover 140, or other position and orientation parameters of the material mover 140.

Figure 8:
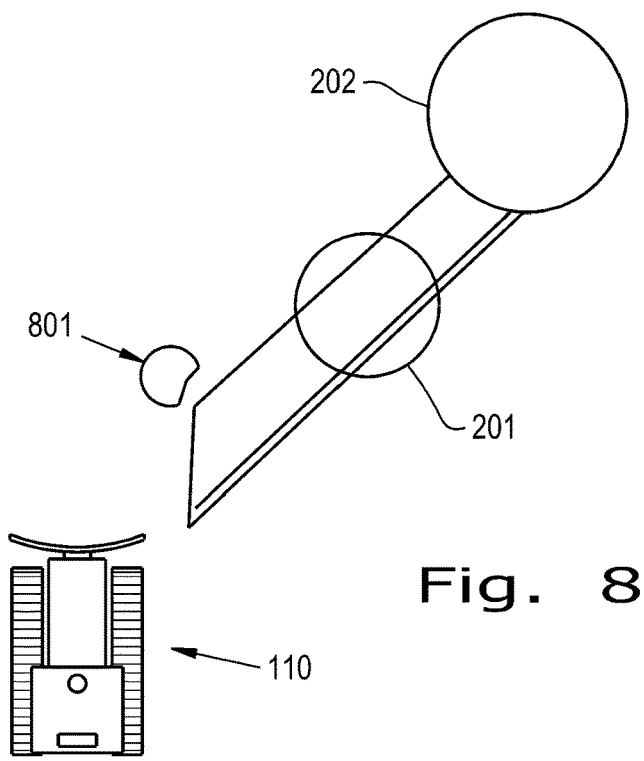
FIG. 8 is a top view of a work site which has a terrain irregularity present.

If the controller system 120 detects inefficient and/or unsafe operation of the bulldozer 110 while the bulldozer 110 follows the initially generated travel paths 411, 412, 413, 414, the controller system 120 can designate an area where such inefficient and/or unsafe operation as a terrain irregularity, marked as 801 in FIG. 8, which is taken into account while generating revised travel paths. The controller system 120 can be configured, for example, to either revise the sequence of travel paths in an attempt to allow the bulldozer 110 to operate safely and efficiently while traveling across the terrain irregularity 801 or, if the terrain irregularity 801 is determined to be a dangerous area, revise the sequence of travel paths to completely avoid the terrain irregularity 801.

Figure 9:
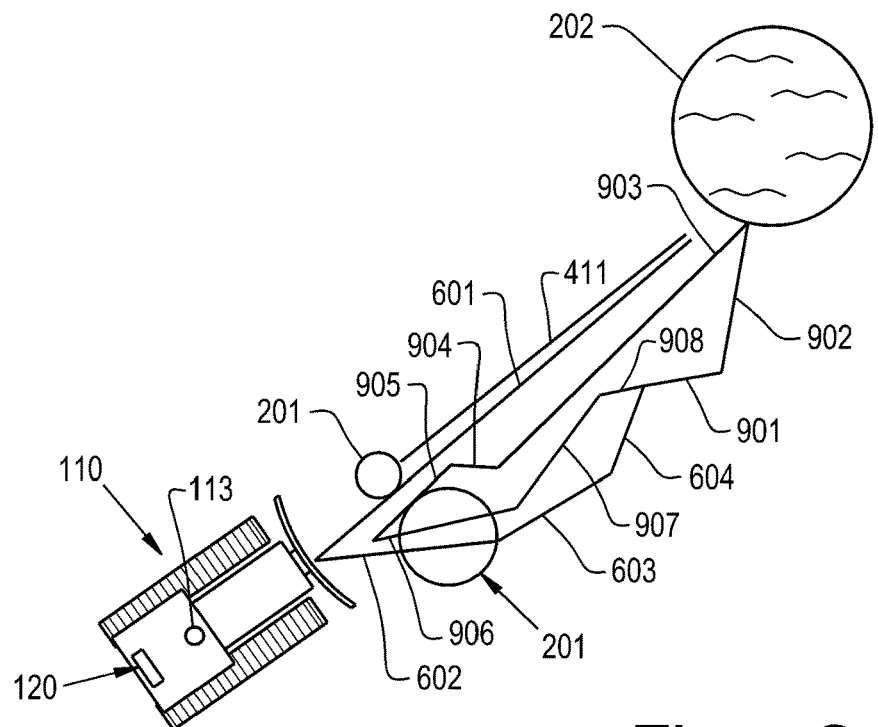
FIG. 9 is a top view of a map illustrating an override sequence of travel paths generated by the controller system in accordance with an exemplary embodiment of the present invention.

Referring now to FIG. 9, the controller system 120 can be configured to receive an override command from an operator riding in the bulldozer 110, which may be useful in situations where the operator sees an upcoming object or terrain hazard that is not accounted for in the travel paths 411, 412, 413, 414, 601, 602, 603, 604 the bulldozer 110 is following. The override command can be, for example, transmitted to the controller system 120 by the steering mechanism 114 when the operator moves a steering controller (not shown) of the steering mechanism 114 to manually control the movement of the bulldozer 110. While the operator manually steers the steering mechanism 114, the controller system 120 can record a series of override travel paths 901, 902, 903, 904 of the bulldozer 110 as the operator manually controls the steering mechanism 114. After the operator has finished manually operating the steering mechanism 114, the controller system 120 can be configured to receive a resume signal from, for example, a coupled touchscreen (not shown) which indicates the controller system 120 should resume control of the steering mechanism 114. Upon receiving the resume signal, the controller system 120 can be configured to generate an override sequence of travel paths 901, 902, 903, 904, 905, 906, 907, 908 which incorporate the override travel positions 901, 902, 903, 904 followed by the bulldozer 110 during the override operation and control the steering mechanism 114 to follow the override sequence of travel paths 901, 902, 903, 904, 905, 906, 907, 908, allowing the controller system 120 to control the steering mechanism 114 in a manner that presumably avoids the hazard motivating the operator to manually control the steering mechanism 114.

Figure 10:
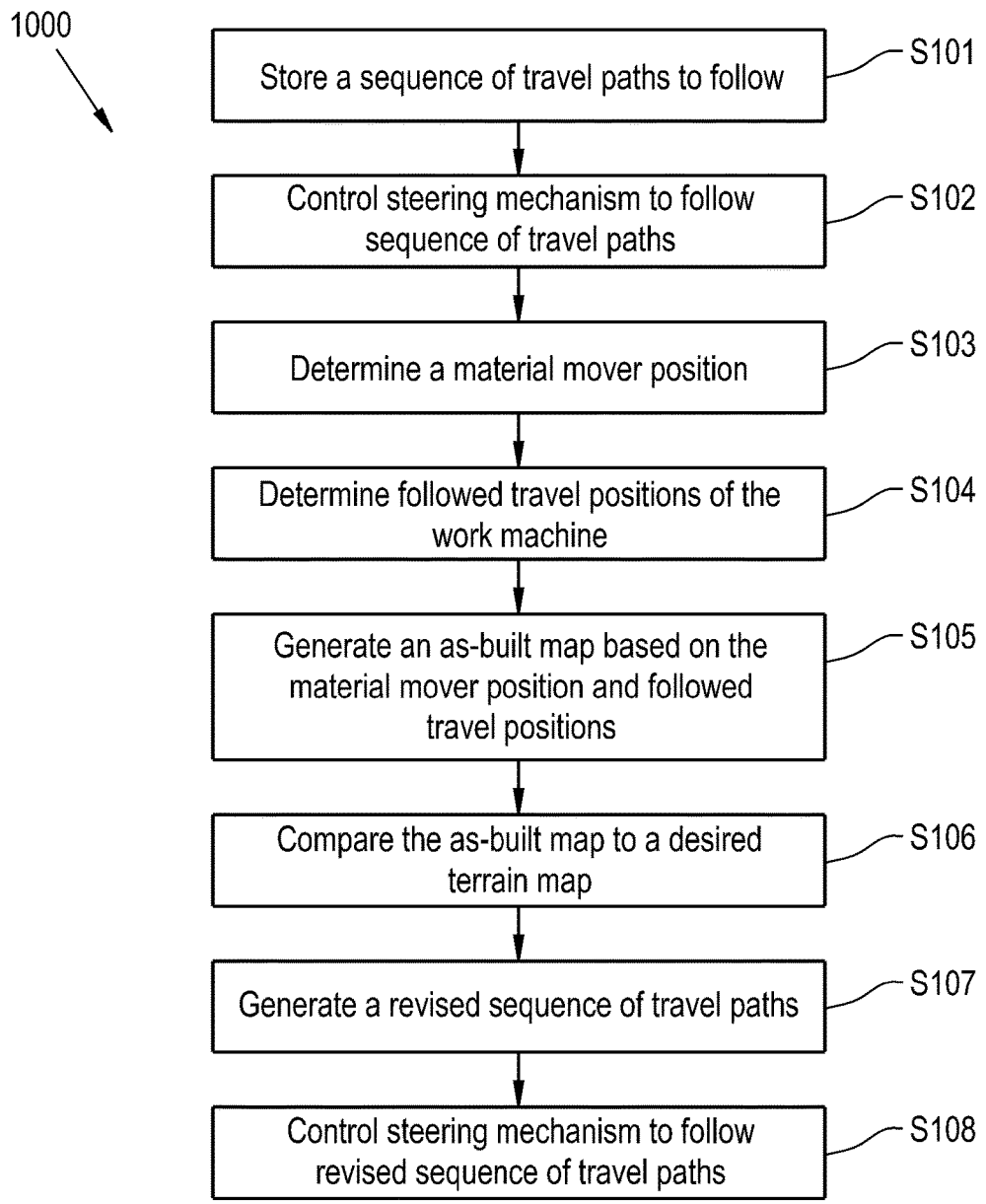
FIG. 10 is a flow chart illustrating an exemplary embodiment of a method in accordance with the present invention.

Referring now to FIG. 10, an exemplary embodiment of a method 1000 implemented by the controller system 120 in accordance with the present invention is shown. The method 1000 includes storing S101 a sequence of travel paths 411, 412, 413, 414 for the bulldozer 110 to follow. The controller system 120 controls S102 the steering mechanism 114 to follow the sequence of travel paths 411, 412, 413, 414, and determines S103 the material mover position 142 and also determines S104 the followed travel positions 501 of the bulldozer 110 based on signals from the location sensor 113. While the bulldozer 110 follows the sequence of travel paths 411, 412, 413, 414, the controller system 120 generates S105 an as-built map 500 based on the material mover position 142 and the followed travel positions 501. The controller system 120 compares S106 the as-built map 500 to a desired terrain map 300 and, based on the comparison S106, generates S107 a revised sequence of travel paths 601, 602, 603, 604 which alters a material volume movement sequence of the bulldozer 110. The controller system then controls S108 the steering mechanism 114 to follow the revised sequence of travel paths 601, 602, 603, 604.

Figure 11:
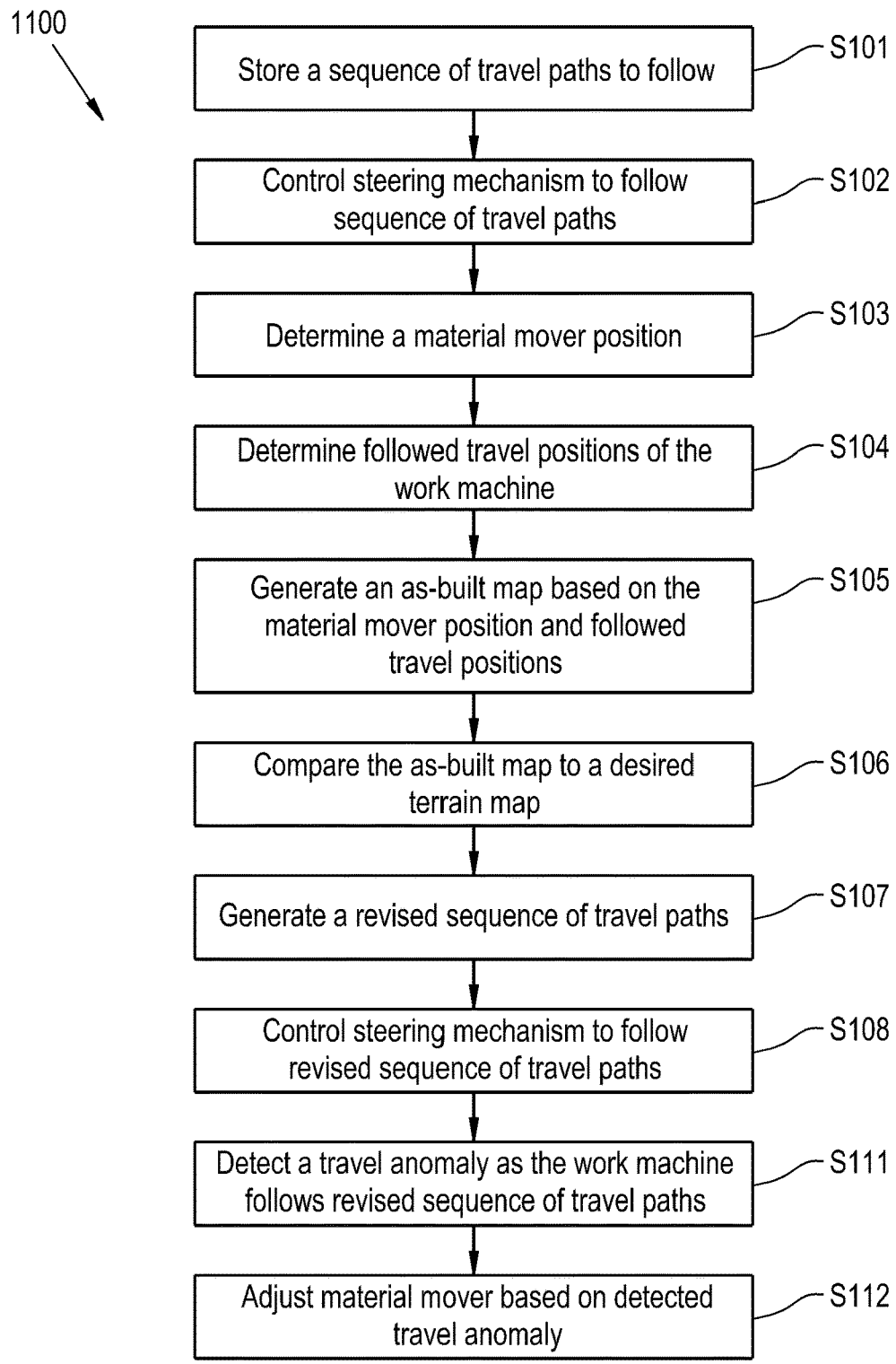
FIG. 11 is a flow chart illustrating another exemplary embodiment of a method in accordance with the present invention.

Referring now to FIG. 11, another exemplary embodiment of a method 1100 implemented by the controller system 120 in accordance with the present invention is shown. As can be seen, the method 1100 substantially comprises the method 1000, with the controller system 120 also detecting S111 a travel anomaly from an output signal of at least one operating parameter sensor 510, 710 of the bulldozer 110 as the work machine 110 follows the revised sequence of travel paths 601, 602, 603, 604. After detecting S111 the travel anomaly, the controller system 120 can adjust S112 the material mover position 142 of the material mover 140 based on the detected travel anomaly. The detected travel anomaly can be, for example, a work machine slip, an undesired fill of the material mover 140, and/or an undesired tilt of the bulldozer 110. The controller system 120 can adjust S112, for example, the height H and/or rake angle αR of the material mover 120 based on the detected travel anomaly.

Figure 12:
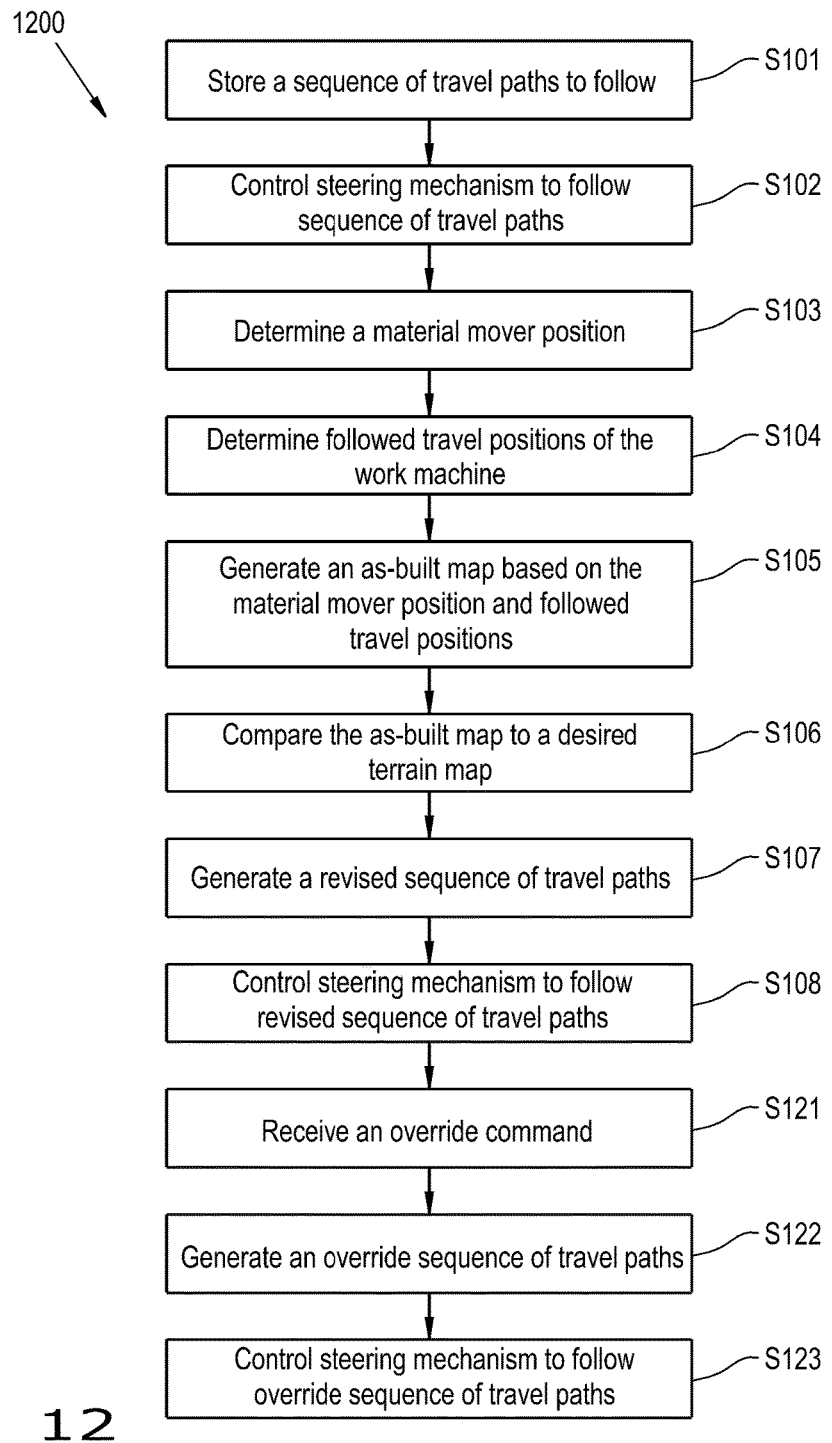
FIG. 12 is a flow chart illustrating yet another exemplary embodiment of a method in accordance with the present invention.

Referring now to FIG. 12, another exemplary embodiment of a method 1200 implemented by the controller system 120 in accordance with the present invention is shown. As can be seen, the method 1200 substantially comprises the method 1000, with the controller system 120 also receiving S121 an override command, generating S122 an override sequence of travel paths 901, 902, 903, 904, 905, 906, 907, 908 subsequently to receiving S121 the override command, and controlling S123 the steering mechanism 114 to follow the override sequence of travel paths 901, 902, 903, 904, 905, 906, 907, 908.

Figure 13:
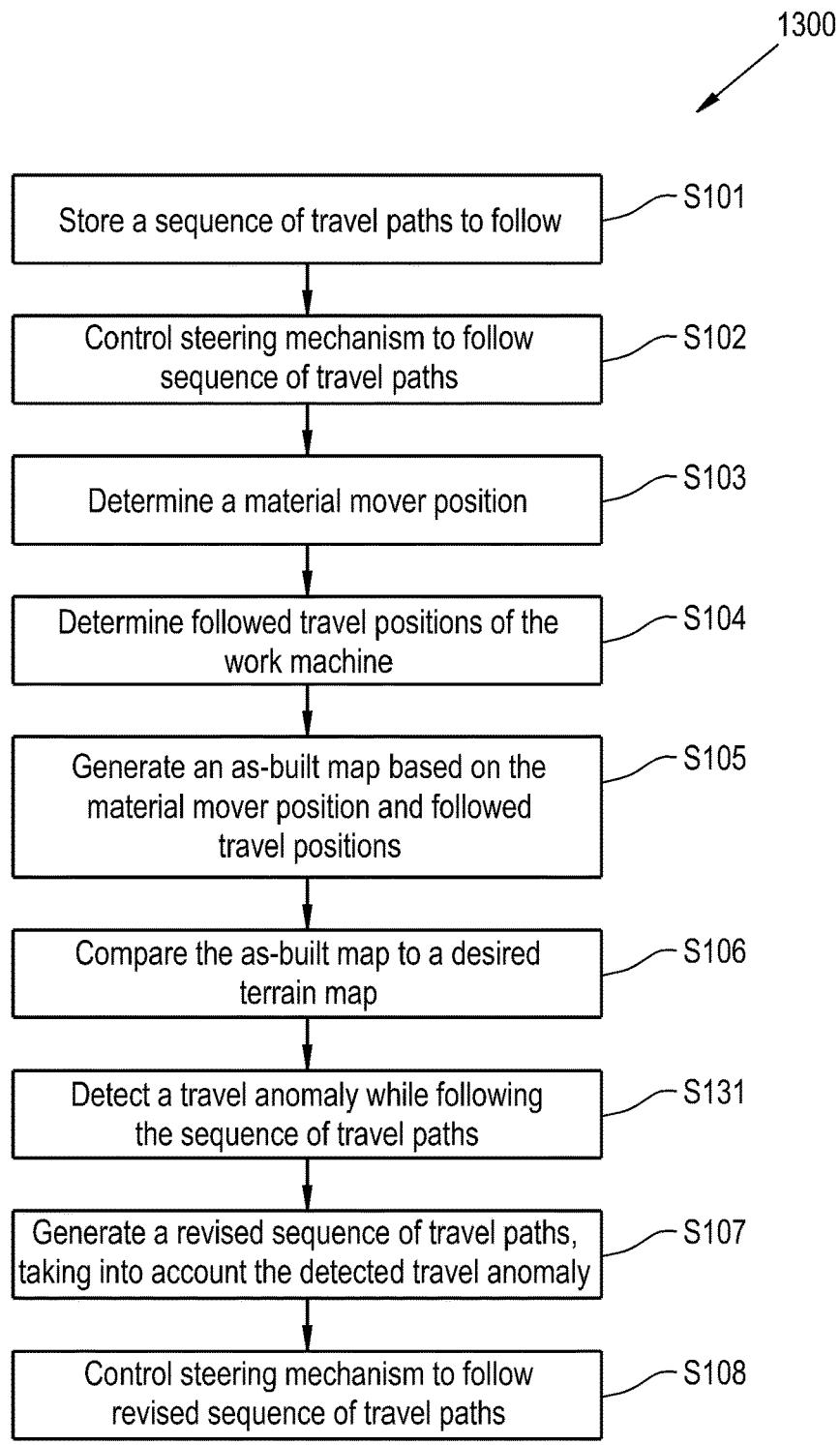
FIG. 13 is a flow chart illustrating yet another exemplary embodiment of a method in accordance with the present invention.

Referring now to FIG. 13, another exemplary embodiment of a method 1300 implemented by the controller system 120 in accordance with the present invention is shown. As can be seen, the method 1300 substantially comprises the method 1000, with the controller system 120 also detecting S131 a terrain irregularity 801 as the bulldozer 110 follows the sequence of travel paths 411, 412, 413, 414. The controller system 120 then takes into account the terrain irregularity 801 while generating S107 the revised sequence of travel paths 601, 602, 603, 604 for the bulldozer 110 to follow.

It is to be understood that the steps of the methods 1000, 1100, 1200, 1300 are performed by a respective controller system 120, which may include one or more controllers 121, 122, upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller system 120 described herein, such as the methods 1000, 1100, 1200, and 1300, is implemented in software code or instructions which are tangibly stored on a tangible computer readable medium. Upon loading and executing such software code or instructions by the controller system 120, the controller system 120 may perform any of the functionality of the controller system 120 described herein, including any steps of the methods 1000, 1100, 1200, and 1300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit, by a controller, or by a controller system.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for moving material at a work site, comprising:
    a work machine comprising a chassis, a material mover carried by said chassis and defining a material mover position, a location sensor carried by said chassis, and a steering mechanism configured to control a travel direction of said work machine; and
    a controller system operably coupled to said material mover, said location sensor, and said steering mechanism, said controller system configured to:
        store a sequence of travel paths for said work machine to follow;
        control said steering mechanism to follow said sequence of travel paths;
        determine said material mover position;
        determine followed travel positions of said work machine based on signals from said location sensor;
        generate an as-built map as said work machine follows said sequence of travel paths based on said material mover position and followed travel positions;
        compare said as-built map to a desired terrain map;
        generate a revised sequence of travel paths for said work machine to follow based on said comparison between said as-built map and said desired terrain map, wherein said revised sequence alters a material volume movement sequence of said work machine; and
        control said steering mechanism to follow said revised sequence of travel paths.

2. The system according to claim 1, wherein said material mover is adjustably carried by said chassis.

3. The system according to claim 2, wherein said work machine further comprises at least one operating parameter sensor and said controller is further configured to:
    detect a travel anomaly from an output signal of said at least one operating parameter sensor while said work machine follows said revised sequence of travel paths; and
    adjust said material mover position of said material mover based on said detected travel anomaly.

4. The system according to claim 3, wherein said travel anomaly is at least one of a work machine slip, an undesired fill of said material mover, and an undesired tilt of said work machine.

5. The system according to claim 3, wherein said controller system is configured to adjust at least one of a height and a rake angle of said material mover based on said detected travel anomaly.

6. The system according to claim 1, wherein said controller system is further configured to:
    receive an override command;
    generate an override sequence of travel paths subsequently to receiving said override command; and
    control said steering mechanism to follow said override sequence of travel paths.

7. The system according to claim 1, wherein said controller system is further configured to detect a terrain irregularity as said work machine follows said sequence of travel paths, wherein said terrain irregularity is taken into account during generation of said revised sequence of travel paths.

8. The system according to claim 1, wherein said material mover comprises a blade defining said material mover position.

9. The system according to claim 1, wherein said controller system is carried by said chassis of said work machine.

10. A method of controlling a work machine comprising a chassis, a material mover carried by said chassis and defining a material mover position, a location sensor carried by said chassis, and a steering mechanism configured to control a travel direction of said work machine, said method being implemented by a controller system and comprising:
    storing a sequence of travel paths for said work machine to follow;
    controlling said steering mechanism to follow said sequence of travel paths;
    determining said material mover position;
    determining followed travel positions of said work machine based on signals from said location sensor;
    generating an as-built map as said work machine follows said sequence of travel paths based on said material mover position and followed travel positions;
    comparing said as-built map to a desired terrain map;
    generating a revised sequence of travel paths for said work machine to follow based on said comparison between said as-built map and said desired terrain map, wherein said revised sequence alters a material volume movement sequence of said work machine; and
    controlling said steering mechanism to follow said revised sequence of travel paths.

11. The method according to claim 10, wherein said material mover is adjustably carried by said chassis.

12. The method according to claim 11, further comprising:
    detecting a travel anomaly from an output signal of at least one operating parameter sensor of said work machine while said work machine follows said revised sequence of travel paths; and
    adjusting said material mover position of said material mover based on said detected travel anomaly.

13. The method according to claim 12, wherein said travel anomaly is at least one of a work machine slip, an undesired fill of said material mover, and an undesired tilt of said work machine.

14. The method according to claim 12, further comprising adjusting at least one of a height and a rake angle of said material mover based on said detected travel anomaly.

15. The method according to claim 10, further comprising:
    receiving an override command;
    generating an override sequence of travel paths subsequently to receiving said override command; and
    controlling said steering mechanism to follow said override sequence of travel paths.

16. The method according to claim 10, further comprising detecting a terrain irregularity as said work machine follows said sequence of travel paths, wherein said terrain irregularity is taken into account during generation of said revised sequence of travel paths.

17. The method according to claim 10, wherein said material mover comprises a blade defining said material mover position.

18. The method according to claim 10, wherein said controller system is carried by said chassis of said work machine.

* * * * *